United States Patent
Herr et al.

(10) Patent No.: US 7,295,892 B2
(45) Date of Patent: Nov. 13, 2007

(54) SPEED-ADAPTIVE CONTROL SCHEME FOR LEGGED RUNNING ROBOTS

(75) Inventors: Hugh Herr, Somerville, MA (US); Andre Seyfarth, Kahla (DE); Hartmut Geyer, Leipzig (DE)

(73) Assignee: Massachusetts Institute of Technology, Cambridge, MA (US)

( * ) Notice: Subject to any disclaimer, the term of this patent is extended or adjusted under 35 U.S.C. 154(b) by 772 days.

(21) Appl. No.: 10/750,573

(22) Filed: Dec. 31, 2003

(65) Prior Publication Data
US 2005/0085948 A1    Apr. 21, 2005

Related U.S. Application Data

(60) Provisional application No. 60/437,703, filed on Dec. 31, 2002.

(51) Int. Cl.
*G06F 19/00* (2006.01)

(52) U.S. Cl. .................. 700/245; 700/258; 318/518.12
(58) Field of Classification Search ............... 700/245, 700/258; 318/518.12, 568.12
See application file for complete search history.

(56) References Cited

OTHER PUBLICATIONS

Zeglin; The Bow Leg Hopping Robot; CMU-RI-TR-99-33; The Robotics Institute; Carnegie Mellon University; Pittsburgh, PA; Oct. 21, 1999; pp. 1-161.*
Hyon et al.; "Energy-Preserving Control of a Passive One-Legged Running Robot;" VSP and Robotics Society of Japan 2004; Advanced Robotics, vol. 18, No. 4, Jan. 2004; pp. 357-381 (2004).
Hyon et al.; "Dynamics-Based Control of a One-Legged Hopping Robot;" Proc. Instn. Mech. Engrs. vol. 217, Part I; J. Systems and Control Engineering; 105502; IMechE 2003; Jan. 2003; pp. 83-98.
Zeglin et al.; "Control of Bow Leg Hopping Robot;" The robotics Institute; Carnegie Mellon University; Pittsburgh, PA 15213, USA; 6 pages.
Buehler; "Dynamic Locomotion with One, Four and Six-Legged Robots;" Ambulatory Robatics Laboratory, Centre for Intelligent Machines; McGill University; Montreal, Quebec, Canada, H3A 2A7; www.cim.mcgill.ca/~artweb; pp. 1-6.

* cited by examiner

*Primary Examiner*—Thomas Black
*Assistant Examiner*—Marie A Weiskopf
(74) *Attorney, Agent, or Firm*—Daly, Crowley, Mofford & Durkee, LLP

(57) ABSTRACT

A control scheme for legged running machines which is based on a decoupled control of system energy and kinematic trajectory is described.

30 Claims, 9 Drawing Sheets

SPEED-ADAPTIVE CONTROL SCHEME FOR LEGGED RUNNING ROBOTS

CROSS REFERENCE TO RELATED APPLICATIONS

This application claims the benefit under 35 U.S.C. §119 (e) of U.S. Provisional Application No. 60/437,703, filed on Dec. 31, 2002, entitled, Speed-Adaptive Control Scheme for Legged Running Robots, which is hereby incorporated by reference in its entirety.

STATEMENT REGARDING FEDERALLY SPONSORED RESEARCH

Not applicable.

BACKGROUND OF THE INVENTION

This invention relates to a control scheme for controlling the locomotion of a legged robot, and more particularly to a control scheme stabilizing any desired, energetically possible movement trajectory at any given locomotion speed within a single step of a running monopod or other legged robot.

Legged locomotion aims to move an object in an intended direction. To achieve this goal, the system must provide enough energy to compensate for losses within the system (e.g. leg damping) and with the environment (e.g. air friction). Thus, legged robots require a control, which keeps the system energy balanced at a desired level, to reach a steady-state movement. However, even with sufficiently controlled system energy, forward locomotion may fail. If a leg is not properly aligned with respect to the ground level (e.g. the ground is higher than expected), the legged system can stumble or fall over. Thus, legged robots require an additional control, which keeps an aimed movement trajectory corresponding to the controlled energy level, and therefore stabilizes the steady-state locomotion.

Running is a special form of legged locomotion incorporating ballistic flight phases to achieve high forward velocities. As of today, the control of running machines is mostly based on (or in part based on) the use of a scheme elaborated by Marc Raibert and collaborators (M. H. Raibert, "Legged robots that balance", MIT Press, Cambridge, Mass., 1986). This control scheme decomposes the control of running into three parts: the control of hopping height, forward speed, and posture. It therefore mixes the formerly introduced control of system energy and kinematic trajectory.

Although this decomposed control can result in dynamically stable locomotion, it inherits several difficulties. First, as it represents an empirical feedback control, it requires the collection of appropriate feedback gains. Second, as it presets the legs in one flight phase to a fixed orientation, the robot can stumble when encountering lifted ground or obstacles. Third, the system requires several steps to stabilize after a perturbation. Lastly, due to the particular control of forward speed, the locomotion system spends additional amounts of energy when running over rough terrain: a lifted (lowered) ground level of one stance phase decreases (increases) the forward speed of the running machine, which is compensated by acceleration (deceleration) due to the explicit velocity control. This is not necessarily required when the mean perturbation in ground level is zero as for uneven terrain of our every day experience, and therefore reduces the range of mobility for autonomous legged robots.

SUMMARY OF THE INVENTION

This invention provides a control scheme for legged running machines, which is based on a decoupled control of system energy and kinematic trajectory (i.e. the separation of kinematic and energetic control).

The present invention yields the appropriate control for any leg operation during the stance phase, which is uniquely determined by the landing conditions. It is not constrained to a further specified leg operation during stance, and does not require empirically gathering of feedback gains.

In steady-state locomotion, the derived control stabilizes any desired, energetically possible movement trajectory at any given locomotion speed within a single step, regardless of the system history. This results from a time-variant, sensor feedforward control of the leg orientation during the swing phase. It therefore provides maximum flexibility for the legged running robot. For instance, within one step and without changing the system energy level, the legged machine can switch from a smooth run, maximizing the amount of energy put into forward locomotion on even ground (like a paved road), to a bouncy run, maximizing the systems locomotion stability in unpredicted, uneven terrain. This flexible control does not require acceleration or deceleration of the machine during stance, and can overcome larger obstacles or terrain perturbations than control schemes described in the prior art section.

In accordance with a further aspect of the present invention, a technique for providing rotational leg control during a swing phase of a robotic device includes mapping apex heights of two consecutive flight phases for different angles of attack, selecting all pairs of leg angle and apex heights that result in a desired apex height of a next consecutive flight phase, for each leg angle-apex height pair, computing the corresponding flight times from apex to touch-down and storing dependencies between flight time after apex and leg angle for any desired consecutive apex heights. The technique further includes determining an instant of apex during flight phase by a vertical take-off velocity and beginning at apex, controlling the angular leg orientation using the stored time dependencies for the desired apex height.

With this particular arrangement, a control technique which does not use instantaneous apex height to calculate a leg angle is provided. Rather, in the technique of the present invention, the leg rotates continuously after apex until touch-down occurs. According to a calculated time series of the leg angle, at any possible instant of touch-down, the appropriate leg angle is chosen to result in the desired apex height after one contact, independent of the previous apex condition. Thus, with this technique, the process of leg rotation becomes a significant element of swing leg and the instantaneous flight height (apex height) is not required to stabilize a desired trajectory.

BRIEF DESCRIPTION OF THE DRAWINGS

The above and other objects and advantages of the present invention will be more apparent from the following description and drawings, in which:

FIGS. 9A-9E are a series of views illustrating different phases of a movement;

DETAILED DESCRIPTION

Figure 1:
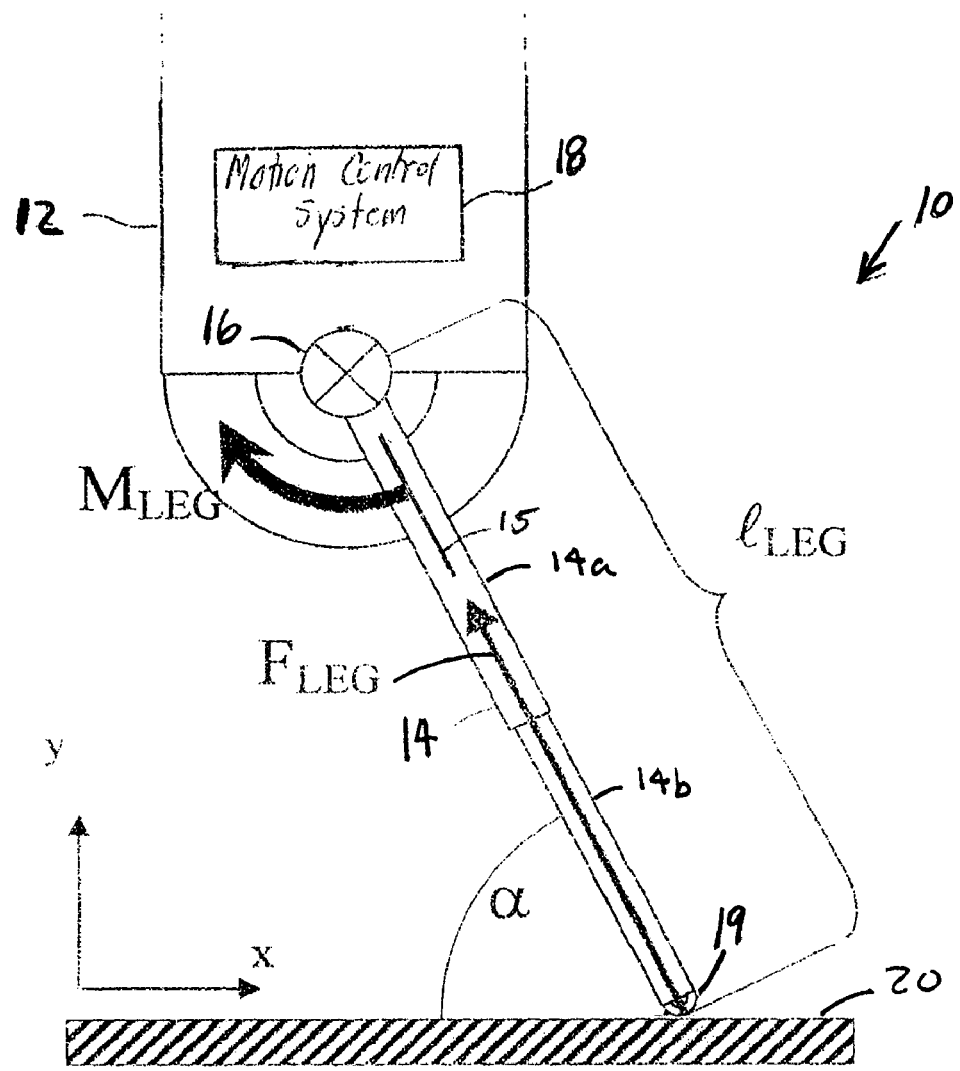
FIG. 1 is a block diagram of a monopod robot as an example of a mobile legged robot.

Exemplary embodiments of the invention will now be explained using a monopod robot as an example of a legged robot. It should be appreciated that the monopod robot of FIG. 1 is intended to merely serve as an example of a legged running machine with which the control system of the present invention can be used and that the control system of the present invention also finds use with a variety of other types of legged running machines. It should also be appreciated that numerous details are set forth below in order to provide a thorough understanding of the control techniques and related apparatus used to provide robot locomotion. It should be apparent to one of ordinary skill in the art that variants of the below described techniques and apparatus may be used in other embodiments without deviating from the spirit and scope of the concepts described herein. For example, the concepts described below can be implemented in robots having one, two, three or any number of legs. It should be appreciated that in some instances, well-known circuitry is not set forth in detail in order to promote conciseness and clarity in the description of the figures.

Referring now to FIG. 1, a lateral view (x, y-plane) of a monopod robot 10 is shown. The robot 10 has a body 12 and a leg 14 which are interconnected by a revolute joint 16 driven by an electric motor (not shown) and a motion control system 18. The leg 14 is provided having a distal end coupled to the joint 18, a proximal 19 end and a length ("$l_{LEG}$").

The operation of the motion control system 18 will be described in detail below in conjunction with 3-10B. Suffice it here to say, however, that the control system 18 yields the appropriate control for any leg operation during a stance phase, which is uniquely determined by the landing conditions. It is not constrained to a further specified leg operation during stance, and does not require empirically gathering of feedback gains. In steady-state locomotion, the derived control stabilizes any desired, energetically possible movement trajectory at any given locomotion speed within a single step, regardless of the system history. This results from a time-variant, sensor feedforward control of the leg orientation during the swing phase. The motion control system therefore provides maximum flexibility for the legged running robot. For instance, within one step and without changing the system energy level, the legged machine can switch from a smooth run, maximizing the amount of energy put into forward locomotion on even ground (like a paved road), to a bouncy run, maximizing the systems locomotion stability in unpredicted, uneven terrain. This flexible control does not require acceleration or deceleration of the machine during stance, and can overcome larger obstacles or terrain perturbations than control schemes described in the prior art section.

When the proximal end 19 of the leg contacts a surface 20 (e.g. the ground) a leg-force ("$F_{LEG}$") is generated. The joint 16 is equipped with a position sensor that, when combined with a gyroscope, measures an orientation angle (x of the leg with respect to the surface 20. The leg angle $\alpha$ thus describes the leg orientation with respect to the surface 20.

For simplicity, the leg 14 may be modeled as a passive spring having a stiffness k, yielding a repulsive leg response during contact described by a linear leg-force-leg-length relationship (denoted as $F_{LEG}$-$l_{LEG}$) in steady-state locomotion. An actuator can exert a torque ("$M_{LEG}$") on the revolute joint 18, which adjusts the leg orientation during flight and regulates the system energy during stance.

Referring now to FIGS. 2A-2D, different examples of leg operation during stance in steady-state locomotion are shown. As should be appreciated, steady-state locomotion in running requires an energetically balanced, repulsive leg operation, represented by an $F_{LEG}$-$l_{LEG}$ relationship that equalizes system energy production and absorption (additional energy production required due to air friction is neglected).

Figures 2A, 2B, 2C, 2D:
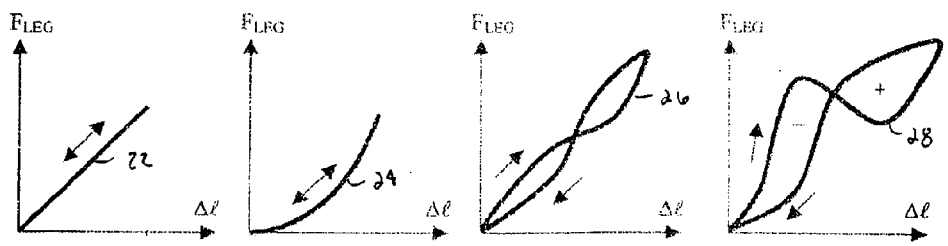
FIGS. 2A-2D are series of plots of leg force ($F_{LEG}$) vs. change in leg length ($\Delta l$) for different examples of leg operation during stance in steady-state locomotion.

FIG. 2A illustrates a spring-like leg operation (i.e. a linear spring-like response) while FIG. 2B illustrates a nonlinear spring-like response. FIGS. 2C and 2D illustrate that other leg responses are equally possible.

The leg operation is shown as a (leg-force)-(leg shortening)-dependency $F_{LEG}(\Delta l)$ with $\Delta l(t)=l_0-l_{LEG}(t)$ and $l_0$ is the leg length at touch-down.]

Figure 3:
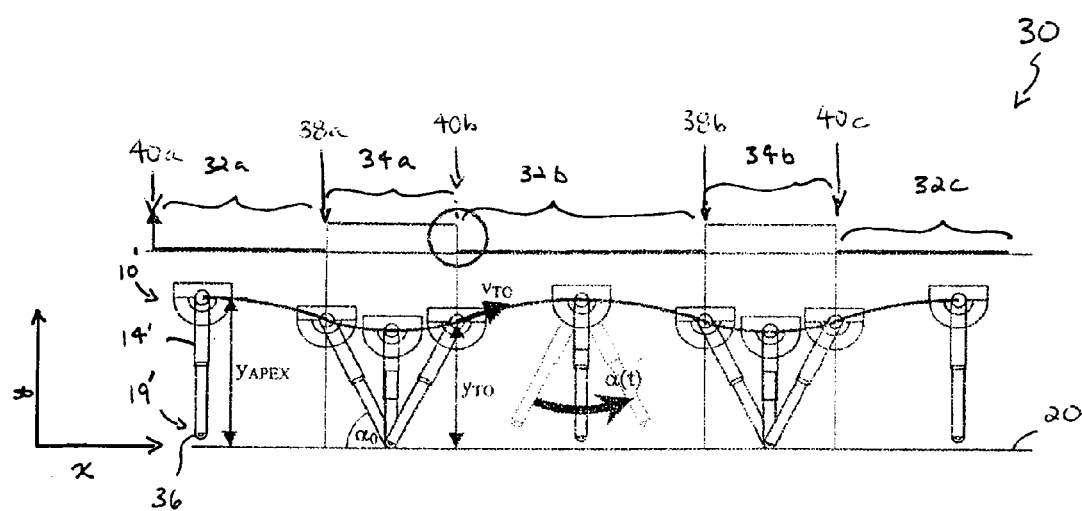
FIG. 3 is an explanatory view showing the robot illustrated in FIG. 1 moving with alternate flight and contact phases.

Referring now to FIG. 3), a running sequence 30 includes alternate flight phases 32a-32c (generally denoted 32) and contact or stance phases 34a-34b (generally denoted 34) for a monopod robot 19' which may be similar to the robot described above in conjunction with FIG. 1. Robot 19' includes a contact switch or sensor 36 disposed on a distal end 19' of the leg 14' which detects when the robot leg 14' is in contact with a surface 20 (referred to as a contact phase). The actual leg compression may be measured with a position sensor, for example and the sensor 36 may include a force sensor disposed on the distal end of the leg to detect the contact phase.

The end of each flight phase 32 and beginning of each contact phase 34 are defined by respective touchdown points 38a, 38b, generally denoted 38. Similarly, the end of each contact phase 34 and beginning of each flight phase 32 is defined by a respective take-off point 40a-40c, generally denoted 40. During the flight phases 32, the sensor 36 is off and during the contact phases 34 the sensor 36 is on. Thus, the sensor 36 detects the stance phase, during which the leg angle $\alpha$ (FIG. 1) and the leg length l (FIG. 1) are measured.

At take-off point 40b, the total system energy $E_{TO}$ is given by the vertical position $y_{TO}$ and the take-off velocity $v_{TO}$ according to:

$$E_{TO} = \frac{m}{2}(\dot{l}_{TO}^2 + l_{TO}^2\dot{\alpha}_{TO}^2) + mg \cdot l_{TO}\sin\alpha_{TO}. \quad \text{Eq. 1}$$

As in steady-state locomotion the system energy can be considered constants the latter one equals the energy at take-off $E_S=E_{TO}$. This is used to derive the appropriate control for the desired movement trajectory.

In contrast to the total system energy $E_{TO}$, the instant of the apex relative to take-off is merely determined by the vertical take-off velocity $v_{TO,Y}$. For any energy $E_{TO}$ and a defined leg function (repulsion) during stance (FIGS. 2A-2D), the rotational leg control $\alpha(t)$ during the swing phase can be calculated using a return map $y_{i+1}(y_i, \alpha_0)$ of the apex height $y_{APEX}$. An exemplary return map is described below in conjunction with FIG. 4.

Kinematic Trajectory Control

For constant system energy, the stability of the robot locomotion in the movement direction is determined by the return map of the apex height of two subsequent flight phases. Here, the term "apex" denotes the instant at which the robots center of mass (COM) reaches its highest point during flight, and the term "apex height" is the vertical height $y_{APEX}$ of the COM at this instant. The term "apex return map" is the map of any vertical height $y_i$ at apex i to the resulting vertical height $y_{i+1}$ at the apex i+1 of the subsequent flight phase caused by the leg response during the intermediate contact phase. Besides the leg response in contact, the return map is further influenced by the leg orientation $\alpha_0$ at touch-down.

The simplicity of this approach holds as at apex the state vector determining locomotion stability reduces to $(y, \dot{x}, \dot{y})_{APEX}$ (x has no influence on the system stability), $\dot{y}_{APEX}$ is zero, and, due to the constant system energy $E_s$, $\dot{x}_{APEX}$ can be expressed by $y_{APEX}$.

The aim of the kinematic trajectory control is to select a desired, energetically possible movement trajectory within one step, and to maintain this trajectory in spite of perturbations in ground level or leg response. This aim corresponds to selecting and maintaining a desired apex height $y_{CONTROL}$ as explained previously.

The appropriate control is derived by estimating the return map $y_{i+1}(y_i)$ for all possible angles of attack $\alpha_0$, resulting in a generalized return map $y_{i+1}(y_i)|\alpha_0$.

Figure 4:
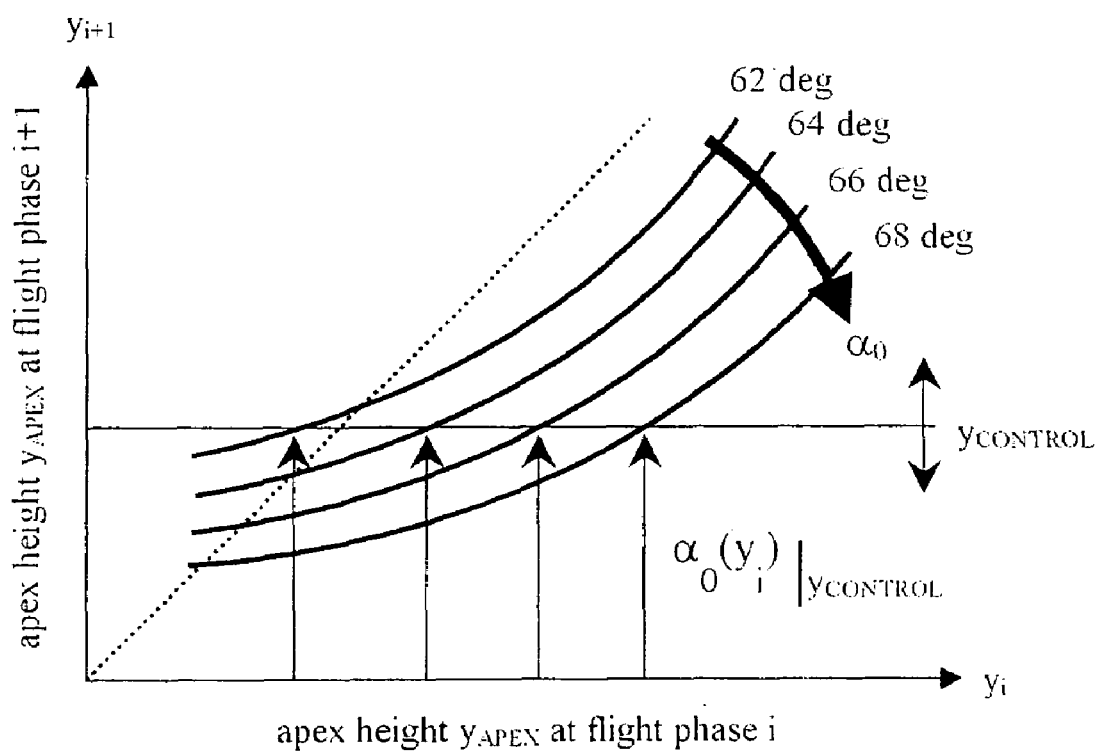
FIG. 4 is an exemplary plot of return maps ($y_{i+1}(y_i)$) of the apex height ($y_{APEX}$) of two subsequent flight phases (i and i+1) for different angles of attack ($\alpha_0$)

Referring now to FIG. 4, a plot of a generalized return map is shown for a monopod robot having a passive spring-like leg response during stance with human like parameters of body mass, leg length, spring stiffness, and system energy. It should be appreciated that an analytical description of the leg operation during stance is not known yet and the return maps have been estimated by forward dynamic simulation of the monopod robot.

Thus, FIG. 4 illustrates a schematic plot of return maps $y_{i+1}(y_i)$ of the apex height $y_{APEX}$ of two subsequent flight phases (i and i+1) for different angles of attack $\alpha_0$. It should be appreciated form FIG. 4 that a desired apex height $y_{CONTROL}$ can be enforced if the angle of attack $\alpha_0$ is properly adapted to the apex height of the preceding flight phase $y_i$.

In this representation of the stability behavior of the monopod robot, the 'idealized' return map projecting any preceding apex height $y_i$ to the desired apex height $y_{CONTROL}$ within one step is characterized by the horizontal line $y_{i+1}(y_i) = y_{CONTROL}$. The intersections of this line with the return maps $y_{i+1}(y_i)|\alpha_0$ for various but fixed angles of attack $\alpha_0$ uniquely determines the angle of attack adjustment $\alpha_0(y_{APEX})$, which is required to project any preceding apex height $y_i$ to the desired apex height $y_{CONTROL}$. This angle adjustment at touch-down transforms into a time-variant feedforward control $\alpha(t-t_{APEX})$ starting at the instant of apex $t_{APEX}$ by using the equation of motion of a ballistic flight $$t - t_{APEX} = \sqrt{\frac{2}{g}(y_{APEX}(\alpha_0) - l_0 \sin\alpha_0)}, \quad \text{Eq. 2}$$

where $l_0$ is the leg length of the monopod robot at touch-down and $y_{APEX}(\alpha_0)$ is the inverse of the angle of attack adjustment. The instant of apex is estimated by the vertical velocity at take-off using $$t_{APEX} = t_{TO} + \frac{\dot{y}_{TO}}{g} = t_{TO} + \frac{1}{g}(l_{TO}\sin\alpha_{TO} - l_{TO}\dot\alpha_{TO}\cos\alpha_{TO}), \quad \text{Eq. 3}$$

and comparing this value with an internal clock.

Figure 5:
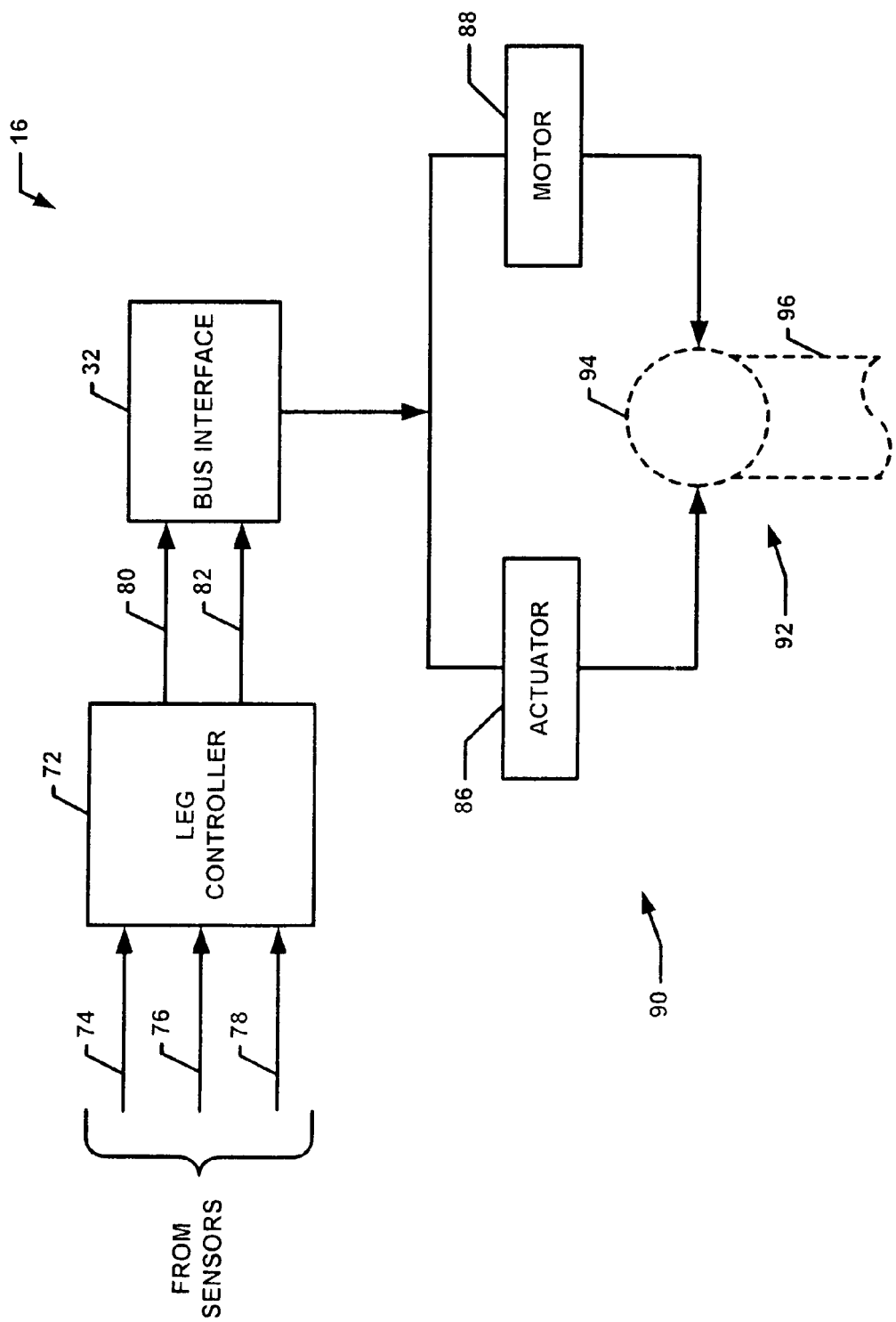
FIG. 5 is a block diagram of an exemplary control system.

Referring now to FIG. 5, a robot system 70 includes a leg controller 72 which receives a leg angle input 74, a leg length input 76 and a contact phase control signal 78. The leg controller provides a leg rotation control signal 80 and a leg torque control signal 82 to a buss interface 84. The buss interface 84 is coupled to an actuator 86 and a motor 88 of a robot 90. The actuator in 86, 88 are coupled to a leg 92 comprising a revolute joint 94 and a leg portion 96.

The leg angle, leg length and contact phase control signals 74, 76, 78 are provided to the leg controller 72 from one or more sensors (not shown in FIG. 5) which sends leg angle, leg length and control contact phase of the leg 90.

The leg rotation control and torque control signals 80, 82 provided by the leg controller will be described below in conjunction with FIG. 6. Suffice it here to say that these signals are fed to the actuator 86 and motor 88 which cause the leg 92 to move with predetermined characteristics.

As discussed above and as will become apparent from the description of FIGS. 6 and 7 hereinbelow, the derived control $\alpha(t-t_{APEX})$ is independent of the actual ground level at touch-down and can be implemented in a leg controller by a look-up table or a real-time calculation considering the generalized return map for different levels of system energy $E_S$. Starting at the instant $t_{APEX}$, the leg controller commands the motor positioning signal $\alpha(t-t_{APEX})$, which permanently adjusts the leg orientation until ground contact is reached. Ground contact can be detected by a sensor (e.g. a force sensor). The sensor may, for example, be disposed on the distal end of the leg.

Figure 6:
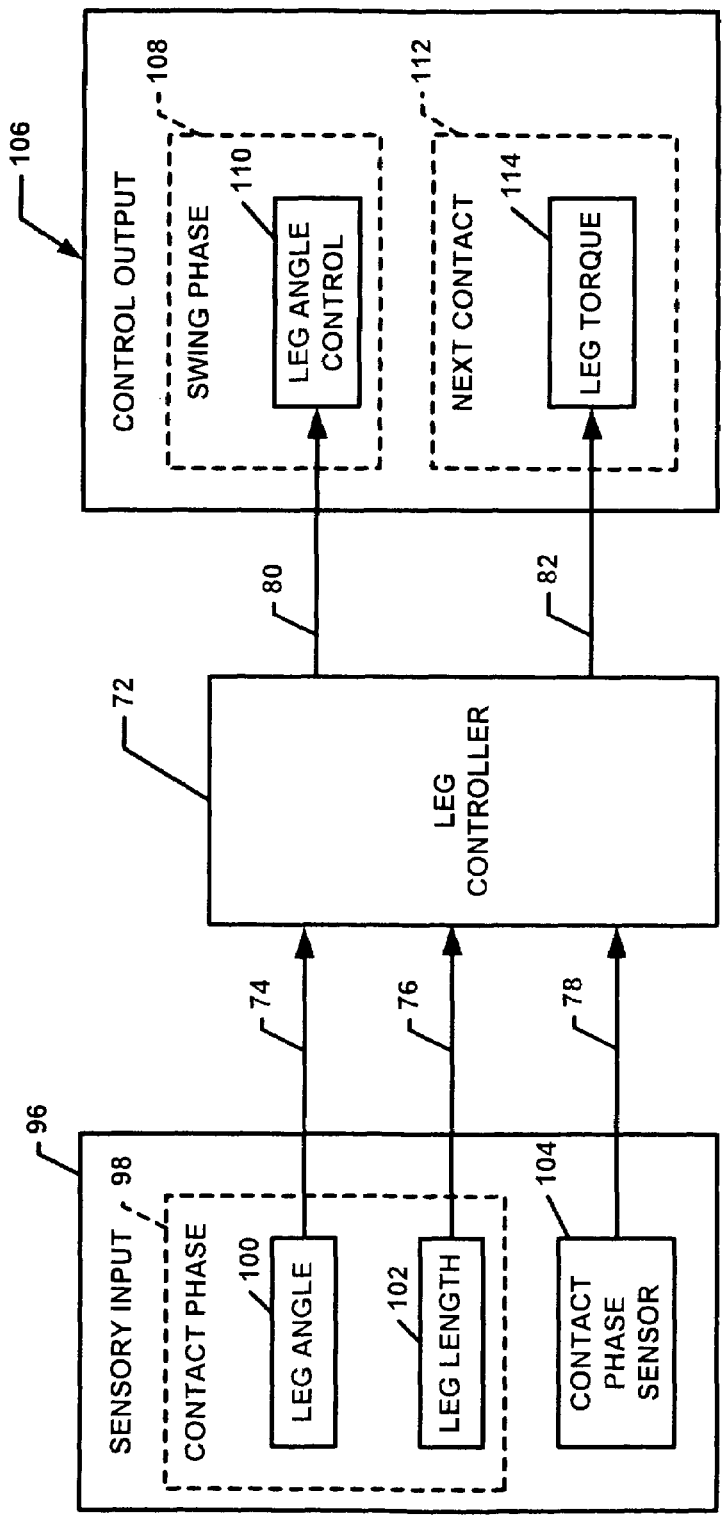
FIG. 6 is a block diagram of an exemplary control system which illustrates a decoupling between energy and kinematic trajectory.

Referring now to FIG. 6, in which like elements of FIG. 5 are provided having like reference designations, the leg controller 72 receives the leg angle signal 74, the leg length signal 76 and the phase control signal 78 from a sensory input system 96. Sensory input system 96 may be provided, for example, from a plurality of discrete sensors which are not in communication with each other. Alternatively, sensory input system 96 may be provided from one or more sensors one or more of which are in communication with each other. Thus, sensory input system 96 may be provided as a discrete sensor system, a partially integrated sensor system or a fully integrated sensor system.

As sensory input, the measurement of leg angle and leg length is required during stance. Additionally, a sensor detects the contact of the leg. Thus, the leg angle signal 74 and the leg length signal 76 are generated from a measurement of a leg angle $\alpha(t)$ 100 and leg length $l_{LEG}(t)$ 102, respectively, which are made during a contact phase 98. Similarly, the contact phase control signal 78 is generated from a contact phase sensor 104.

In response to the signals provided thereto, the leg controller 72, which is described in more detail in conjunction with FIG. 7 below, computes a first control signal 80 corresponding to a time-variant leg orientation value (or leg control angle) 10 used during a swing phase 108. In a preferred embodiment, the swing phase 108 occurs subsequent to the contact (or stance) phase 98 in which the measurements are made. The leg controller 72 also computes a second control signal 82 corresponding to a leg torque generation value 114 which is used in a next contact phase 112 (i.e. the leg torque generation value 114 is used in a contact phase which occurs after the swing phase 108. The leg controller 72 thus calculates the time-variant leg orientation during 110 in accordance with a desired movement trajectory as well as the necessary torque generation 114 of the joint actuator applied during the following contact phase 112. This approach results in a system having decoupled control of system energy and kinematic trajectory.

Figure 7:
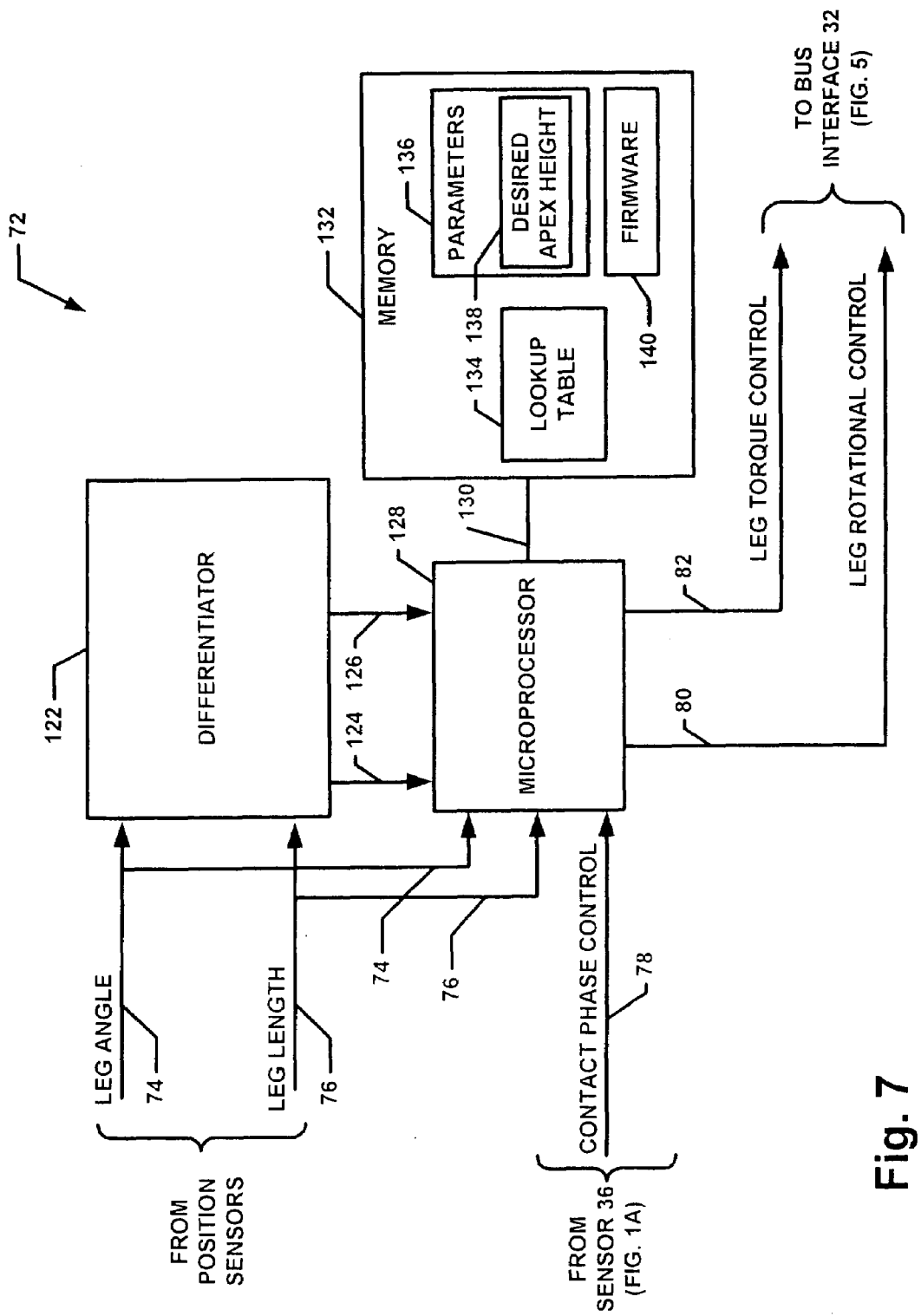
FIG. 7 is a block diagram of an exemplary embodiment of the leg controller illustrated in FIG. 6.

Referring now to FIG. 7, in which like elements of FIGS. 5 and 6 are provided having like reference designations, the leg controller 72 includes a differentiator 122 which receives the leg length and leg angle values 74, 76 from sensors (e.g. position sensors) and provides leg angular velocity and leg shortening velocity values 124, 126 to a microprocessor 128. The microprocessor 128 also receives the leg length and leg angle values 74, 76 as well as a contact phase control value 78 which may, for example, be provided from a force sensor (e.g. sensor 19 in FIG. 1A).

The microprocessor 128 is coupled to a memory 132 having stored therein a look-up table 134 which holds control values for use in a generalized return map for different levels of system energy $E_S$. Memory 132 also includes a parameter storage 136 having stored therein one or more values of desired apex height 138 and firmware which can be used to actively compute return map values in real time. The microprocessor 128 provides the leg rotational control and leg torque control output signals 80, 82 to a bus interface (e.g. bus interface 32 in FIG. 5).

The system illustrated in FIGS. 6 and 7 estimates (i) the mechanical system energy at take-off $E_{TO}$, and (ii) the instant of apex $t_{APEX}$ within the following flight phase according to the above equations. Using these two parameters, the rotational leg control α(t) within the subsequent flight phase and the leg control during the following contact phase are determined according Equations 1-3 above.

The energetic losses during flight (air friction) can be taken into account by approximating the resultant system energy. However, even for moderate speeds, the losses are comparable small and the derived control α(t–$t_{APEX}$) for the system energy $E_s$ equal to the take-off energy $E_{TO}$ highly suffices to control the desired kinematic trajectory within one step.

System Energy Control

As discussed above, the kinematic control of the present invention is explained on the example of a monopod robot with a passive spring-like leg response in steady state. For a given system energy $E_S$, this control stabilizes a desired movement trajectory of the running monopod robot within one step by adjusting the leg orientation during flight in a feedforward manner.

A control of the system energy itself is decoupled from the stabilization of the robot locomotion and allows for (i) the compensation of the inevitable losses of the legged robot (e.g. friction or damping, accumulated during locomotion), (ii) active control of how much energy is spent for locomotion (e.g. desired acceleration or deceleration), (iii) the restoration of a desired system energy when the robot runs on a lastingly in or declining surface, (iv) or the like.

Given the actual system energy $E_{TO}$ at take-off, the difference between the desired ($E_{CONTROL}$) and the actual energy determines the amount of energy that has to be supplied (or absorbed):

$$\Delta E = E_{CONTROL} - E_{TO}. \qquad \text{Eq. 4}$$

The electric motor of the monopod robot can exert a torque M on the revolute joint during the contact phase, and therefore, can actively de- or accelerate the passive leg rotation due to the dynamics of the leg on a freely moving joint (M=0). Hence, the required change in energy is expressed using:

$$\Delta E = \int M \dot{\alpha} dt. \qquad \text{Eq. 5}$$

For simplicity, the electric motor of the monopod robot can only apply a constant torque during the stance phase. Starting at touch-down the required change in energy yields the constant torque that has to be applied in the stance phase $$M_{\Delta E, \mu} = \frac{\Delta E}{\Delta \alpha} = \frac{\Delta E}{\mu(\pi - 2\alpha_0)}, \qquad \text{Eq. 6}$$

where $\alpha_0$ is the angle at touch-down. The constant factor 0<μ<1 takes into account that the angle Act swept during stance can be shorter than in steady-state locomotion. A factor μ=0.5 guarantees that the sufficient torque is applied when the torque generation starts at touch-down and stops at an leg angle α(t)=π/2.

The torque application (Eq. 6) required for the system energy control is implemented in the leg controller (see FIGS. 5-7). Starting at the instant of touch-down (sensed by the distal force sensor), the leg controller commands the electric motor the torque signal $M_{\Delta E, 0.5}$ lasting until the instant at which the angle α(t)=π/2 is reached (sensed by the angle position sensor).

Thus, the present invention is applied to any legged robot's control insofar as the control decouples into a system energy and kinematic movement trajectory control.

It should be noted that, although the monopod robot is disclosed in the embodiment as an example of a mobile robot, the invention will also be applied to two or more legged robot. It should further be noted that, although the leg response of the monopod robot disclosed in the embodiment is characterized by a passive linear spring, the invention will also be applied to any leg operation in stance, which is characterized by a repulsive force response that, in the movement direction x, is uniquely predicted by the landing conditions ($l_{TD}$, $\alpha_{TD}$, $v_{X,TD}$, $v_{Y,TD}$). It should further be noted that, although the energy control disclosed in the embodiment is based on the application of a torque at the revolute joint (rotational energy control), the invention will also be applied to an energy control that is based on the application of axial force of an active leg. Here, the required axial force $F_{axial}$ for a change ΔE in system energy can be derived using Equation 7:

$$\Delta E = \int F_{axial} \dot{l} dt. \qquad \text{Eq. 7}$$

It should further be noted that the invention will also be applied to a superposition of axial and rotational energy control. Here, the required torque and axial force for a change in system energy can be distributed according to Equation 8:

$$\Delta E = \lambda \Delta E_{rot} + (1-\lambda) \Delta E_{axial}, \quad 0 \leq \lambda \leq 1. \qquad \text{Eq. 8}$$

It should be further noted that, although an angle position sensor and a gyroscope is disclosed in the embodiment, the invention will also be applied to any sensory setup, which yields the leg orientation with respect to gravity. It Should be further noted that, although an angle position sensor and a leg length sensor is disclosed in the embodiment, the invention will also be applied to any sensory setup, which yields the system energy and the instant of apex. It should further be noted that, although a force sensor is disclosed in the embodiment, the invention will also be applied to any sensory setup, which detects contact and flight phases of the mobile legged robot.

In running, the spring-like axial behavior of stance limbs is a well-known and remarkably general feature. The present invention, however, considers how the rotational behavior of limbs affects running stability.

It is commonly observed that running animals retract their limbs just prior to ground contact, moving each foot rearward towards the ground. A conservative spring-mass model is employed to test the effects of swing-leg retraction on running stability. A feed-forward control scheme is applied where the swing-leg is retracted at constant angular velocity throughout the second half of the swing phase. The control scheme allows the spring-mass system to automatically adapt the angle of attack in response to disturbances in forward speed and stance-limb stiffness. Using a return map to investigate system stability, an optimal swing-leg retraction model for the stabilization of flight phase apex height is proposed. Results indicate that swing-leg retraction significantly improves the stability of spring-mass running, suggesting that swing phase limb dynamics may play an important role in the stabilization of running animals.

In running, kinetic and potential energy removed from the body during the first half of a running step is transiently stored as elastic strain energy and later released during the second half by elastic recoil. The mechanism of elastic recoil was first proposed in 1964 when it was noticed that the forward kinetic energy of the body's center of mass is in phase with fluctuations in gravitational potential energy. It was hypothesized that humans and animals most likely store elastic strain energy in muscle, tendon, ligament, and perhaps even bone to reduce fluctuations in total mechanical energy. Motivated by these energetic data, further research led to the proposal of a simple model to describe the stance period of symmetric running gaits: a point mass attached to a massless, linear spring. Using animal data to select the initial conditions at first ground contact, it was demonstrated that the spring-mass model can predict important features of stance period dynamics.

Since its formulation the spring-mass model has served as the basis for theoretical treatments of animal and human running, not only for the study of running mechanics, but also stability. In 1999, the stability of hexapod running in numerical simulation was investigated. At a preferred forward velocity, a pre-defined sinusoidal pattern of each leg's ground reaction force resulted in stable movement patterns. However, the legs could not be viewed as entirely spring-like since their force production did not change in response to disturbances applied to the system. A later study found a lateral spring-mass stability for hexapod running on a conservative level where total mechanical energy is constant. However, that study investigated lateral and not sagital plane stability in a uniform gravitational field. Also investigated was the stride-to-stride sagital plane stability of a spring-mass model. Although the model is conservative it can distribute its energy into forward and horizontal direction by selecting different leg angles at touch-down. Surprisingly, this partitioning reveals to be asymptotically stable and predicts human data at moderate running speeds (5 m/s). However, model stability cannot be achieved at slow running speeds (<3 m/s). Additionally, at moderate speeds (<5 m/s), a high accuracy of the landing angle (±1°) is required, necessitating precise control of leg orientation.

The control strategies described herein enhance the stability of the spring-mass model on a conservative level. Unlike prior control schemes in which the angle with which the spring-mass model strikes the ground is held constant from stride-to-stride, the technique of the present invention relaxes this constraint and impose a swing-leg retraction, a behavior that has been observed in running humans and animals in which the swing-leg is moved rearward towards the ground during late swing-phase. This controlled limb movement has been shown to reduce foot-velocity with respect to the ground, and therefore, landing impact. Additionally, a biomechanical model for quadrupedal locomotion indicated that leg retraction could improve stability in running. It is hypothesized herein that swing-leg retraction improves the stability of the spring-mass model by automatically adjusting the angle with which the model strikes the ground from one stride to the next.

Spring-mass Running with Leg Retraction

As discussed in FIG. 3 above, running is characterized by a sequence of contact and flight phases. For the contact phase, researchers have described the dynamics of the center of mass with a spring-mass model comprising a point mass attached to a massless, linear leg spring. To describe the dynamics of the flight phase, a ballistic representation of the body's center of mass has been used. In the investigation of the stability of spring-mass running, it was assumed that the leg spring strikes the ground at a fixed angle with respect to the ground.

In contrast, an in accordance with the present invention, the orientation of the leg during the swing phase is now considered a function of time $\alpha(t)$. For simplicity, a linear relationship between leg angle (measured with respect to the ground) and time starting at the apex $t_{APEX}$ with an initial leg angle $\alpha_R$ (retraction angle):

$$\alpha(t) = \begin{cases} \alpha_R & \text{for } t < t_{APEX} \\ \alpha_R + \omega_R(t - t_{APEX}) & \text{for } t \geq t_{APEX} \end{cases}, \quad \text{Eq. 9}$$

where $\omega_R$ is a constant angular leg velocity (retraction speed) is assumed.

Figure 8:
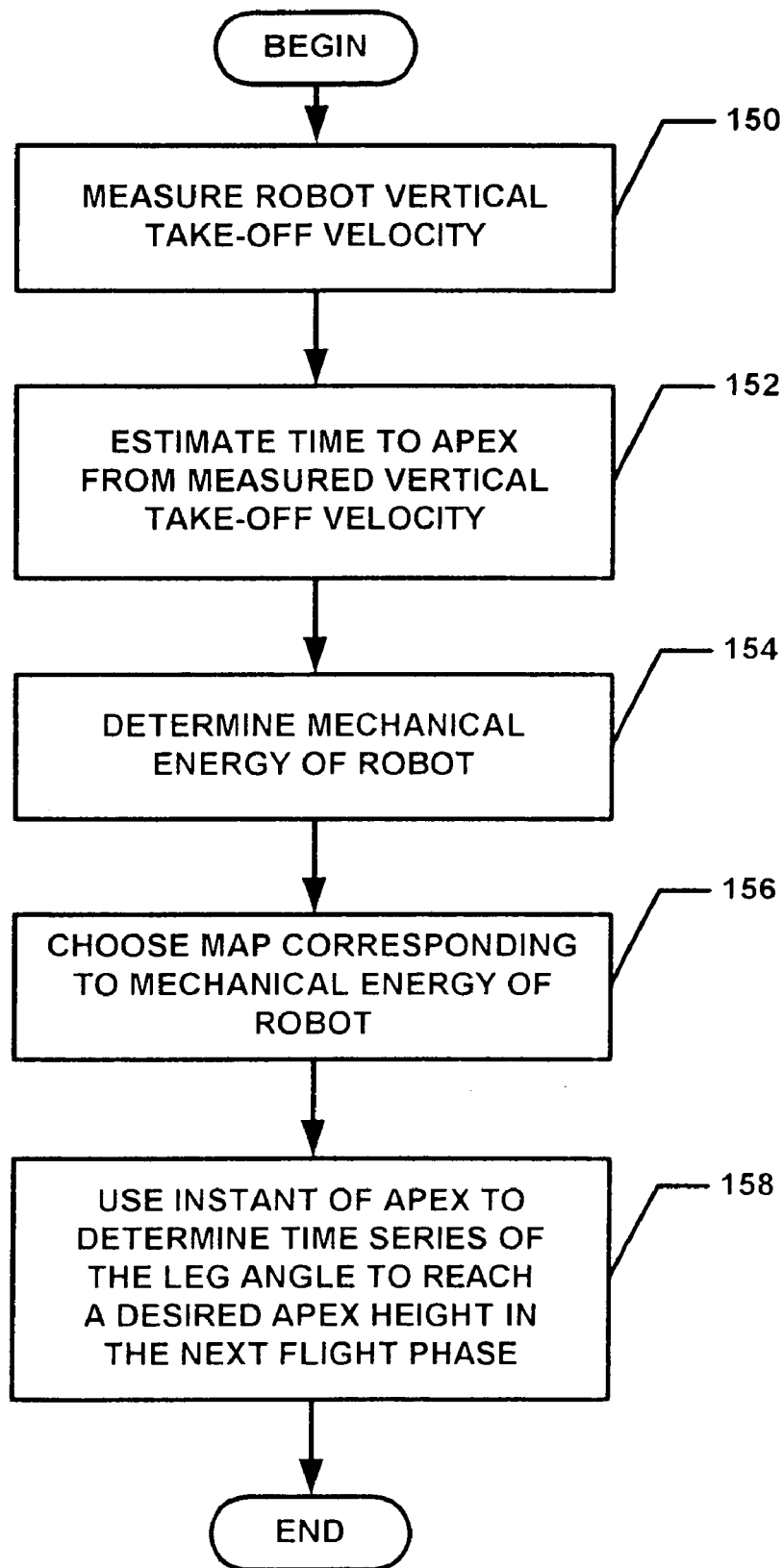
FIG. 8 is a flow diagram which illustrates the processing performed to control a legged robot.

FIG. 8 is a flow diagram showing the processing performed by a processing apparatus which may, for example, be provided as part of a robot control system such as that shown in FIGS. 1-7. The rectangular elements (e.g. block 150 in FIG. 8) in the flow diagram are herein denoted "processing blocks" and represent steps or instructions or groups of instructions. Some of the processing blocks can represent an empirical procedure or a database while others can represent computer software instructions or groups of instructions. Thus, some of the steps described in the flow diagram may be implemented via computer software while others may be implemented in a different manner e.g. via an empirical procedure.

Alternatively, some of the processing blocks can represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to perform the steps or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that, unless otherwise indicated herein, the particular sequence of steps described is illustrative only and can be varied without departing from the spirit of the invention.

Turning now to FIG. 8, a process for controlling a legged robot begins by measuring a robot vertical take-off velocity as shown in block 150. Processing then proceeds to block 152 in which and estimate time to apex is made from a measure vertical take-of velocity. Processing then proceeds to block 154 in which the mechanical energy of the robot is determined. Once the mechanical energy is determined, a map corresponding the mechanical energy of the robot is selected. Processing the proceeds to block 158 where an instant of apex is used to determine a time series of the leg angle to reach a desired apex height in a next flight phase. Processing then ends for that particular flight/contact phase. Blocks 150-158 may be repeated for each flight and contact phase.

Referring now to FIGS. 9A-9F, a spring-mass model with retraction is shown. Swing-leg retraction in running, as indicated by FIGS. 9A-9E is modeled in FIG. 9F assuming a constant rotational velocity of the leg (retraction speed $\omega_R$) starting at the apex of the flight phase at retraction angle $\alpha_R$. Depending upon the duration of the flight phase, the landing angle of the leg (angle of attack $\alpha_0$) is a result of the model dynamics and has no predefined constant value as in previous models. The axial leg operation during the stance phase is approximated by a linear spring of constant stiffness $k_{LEG}$.

Stability Analysis

To explore regions of stability during running, a return map is used. A return map is a mapping of the system state at a characteristic event within the running cycle. To reduce analysis complexity, the apex (i.e., the highest position during the flight phase), is taken as such a characteristic event. At this time, the system state $(x, y, v_x, v_y)_{APEX}$ is uniquely identified by one variable—the apex height $y_{APEX}$. This is due to (1) the vanishing vertical velocity $v_{y,APEX}=0$, (2) the fact that x has no influence on future periodic behavior, and (3) the conservative nature of the spring-mass system assuming a constant total mechanical energy.

As leg retraction is initiated at the apex of the swing phase, the system state at this instant remains uniquely determined in terms of the apex height $y_{APEX}$. The return map investigates how this apex height changes from step to step, or more precisely, from one apex height (index 'i') to the next one (index 'i+1') in the following flight phase (after one contact phase). For a stable movement pattern, two conditions must be fulfilled within this framework: (1) there must be a periodic solution (Eq. 10A, called fixed point where $y_{APEX}^*$ is the steady state apex height) and (2) deviations from this solution must diminish step by step (Eq. 10B, called asymptotically stable fixed point).

$$y_{i+1}=y_i=y_{APEX}^* \qquad \text{Eq. 10A}$$

$$\left|\frac{dy_{i+1}}{dy_i}\right|_{y_{APEX}^*} < 1, \qquad \text{Eq. 10B}$$

For simplicity, the subscript "APEX" in $y_{i+1}$ and $y_i$ in this nomenclature is left out.

The requirements for stable running can be checked graphically by plotting a selected return map (e.g. for a given retraction angle $\alpha_R$ and a given retraction velocity $\omega_R$) within the $(y_i, y_{i+1})$-plane and searching for stable fixed points fulfilling both conditions. The first condition (Eq. 10A, periodic solutions) requires that there is a solution (i.e. a single point) of the return map $y_{i+1}(y_i)$ located at the diagonal $(y_{i+1}=y_i)$. The second condition (Eq. 10B, asymptotic stability) demands that the slope $dy_{i+1}/y_i$ of the return map $y_{i+1}(y_i)$ at the periodic solution (intersection with the diagonal) is neither steeper than 1 (higher than 45°) nor steeper than −1 (smaller than −45°).

As a consequence of the imposed leg retraction, the return map of the apex height $y_{i+1}(y_i)$ is determined by two subsequent mechanisms: the control of the angle of attack $\alpha_0(y_i)$ before landing (leg retraction) and the dynamics of the spring-mass model resulting in the following apex height $y_{i+1}(\alpha_0, y_i)$. According to the definition of leg retraction (Eq. 9), an analytical relationship between the apex height $y_{APEX}$ and the landing angle of attack $\alpha_0$ exists:

$$y_{APEX}(\alpha_0) = l_0\sin\alpha_0 + \frac{g}{2}\left(\frac{\alpha_0 - \alpha_R}{\omega_R}\right)^2. \qquad \text{Eq. 11}$$

Here, $l_0$ denotes the leg length at touch-down. Merely one branch of the quadratic function in $\alpha_0$ has to be considered as retraction holds only for $t \geq t_{APEX}$ according to Eq. 9 (either $\alpha_0 > \alpha_R$, or $\alpha_0 < \alpha_R$, depending on the sign of $\omega_R$). This allows the control strategy $\alpha_0(y_{APEX})$ to be derived.

The running model is implemented in Simulink (The Mathworks, Inc.) using a built-in variable time step integrator (ode113) with a relative tolerance of 1e-12. For a human-like model (mass m=80 kg, leg length $l_0$=1 m) at different speeds $v_x$ (initial condition at apex $y_{0,APEX}$ and $v_{0,APEX}=v_x$) the leg parameters ($k_{LEG}$, $\alpha_R$, $\omega_R$) for stable running are identified by scanning the parameter space and measuring the number of successful steps. The stability of potential solutions is evaluated using the return map $y_{i+1}(y_i)$ of the apex height $y_{APEX}$ of two subsequent flight phases (i and i+1). Corresponding to a given system energy E, all possible apex heights $0 \leq y_{0,APEX} \leq E/(mg)$ are taken into account. To keep the system energy constant, the forward velocity at apex $v_{0,APEX}=v_x$ was adjusted according to the selected apex height $y_{0,APEX}$ with $m \cdot g \cdot y_{0,APEX}+m/2\cdot(v_{0,APEX})^2=E$. For instance, for a system energy E corresponding to an initial forward velocity $v_x$=5 m/s at an apex height $y_{0,APEX}$=1 m a range of apex heights between 0 and 2.27 m must be taken into account.

Figure 10B:
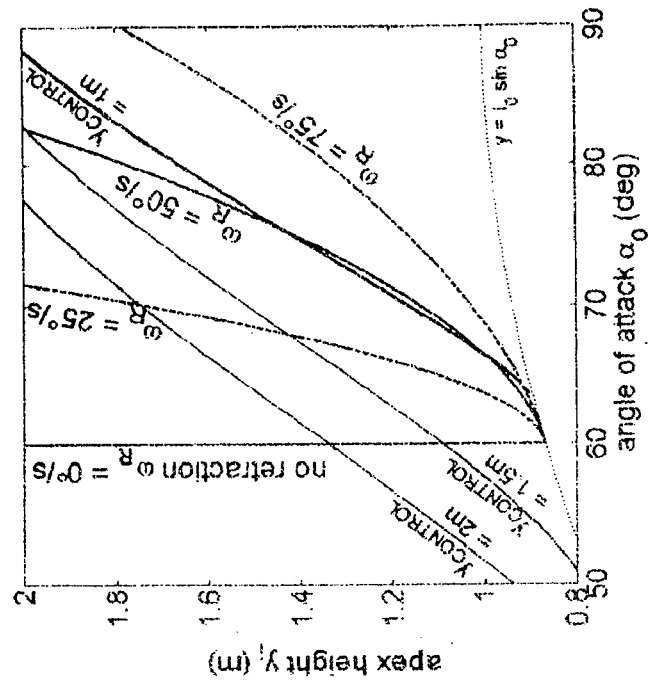
FIG. 10B is a graph of angle of attack versus initial apex height for different desired apex heights, respectively.
Figure 10A:
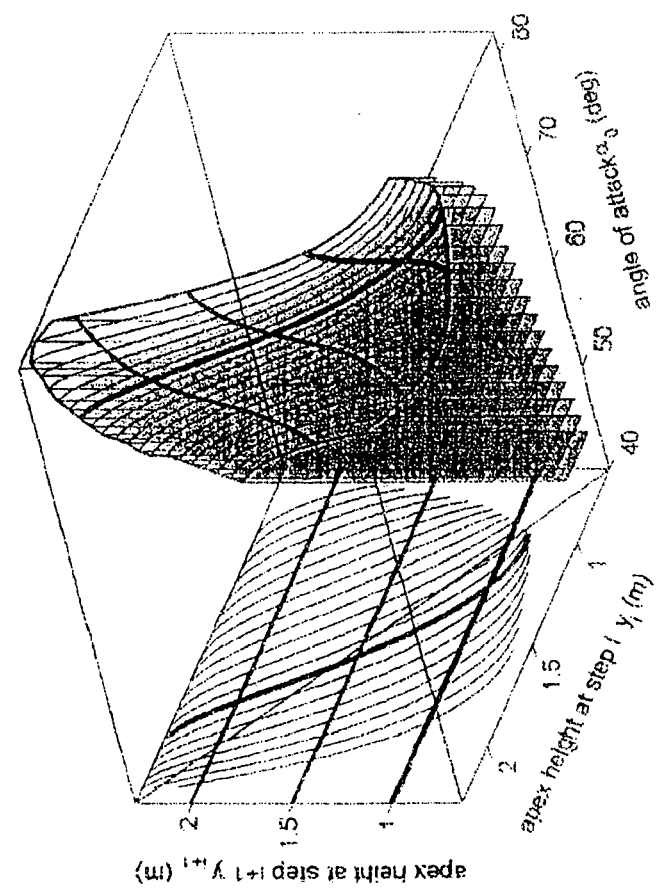
FIG. 10A is a three-dimensional representation of a return map characterizing spring-mass running for different angles of attack.

Referring now to FIGS. 10A and 10B, in terms of the return map of the apex height, an 'optimal' control strategy can be found by imposing the constraint:

$$y_{i+1}(y_i)=y_{CONTROL}=\text{constant}.$$

Within one step this return map projects all possible initial apex heights $y_i$ to the desired apex height $y_{i+1}=y_{CONTROL}$. As a consequence of the dynamics of the spring-mass system, the apex height $y_{i+1}$ is merely determined by the preceding apex height $y_i$ and the selected angle of attack $\alpha_0$. This dependency $y_{i+1}(y_i, \alpha_0)$ can be understood as a fingerprint of spring-like leg operation and is represented as a surface in FIG. 10A. When applying any control strategy $\alpha_0(y_i)$, this generalized surface $y_{i+1}(y_i, \alpha_0)$ can be used to derive the corresponding return maps.

Referring to FIG. 10A, a three-dimensional representation $y_{i+1}(y_i, \alpha_0)$ of the return map $y_{i+1}(y_i)$ characterizes spring-mass running (system energy corresponds to $v_x$=5 m/s at $y_{APEX}$=1 m; m=80 kg, $l_0$=1 m, k=20 kN/m) for different angles of attack $\alpha_0$. For fixed angles of attack (slices in 3D), the corresponding return maps are shown on the left ($y_i$, $y_{i+1}$)-plane. The red line depicts the return map for $\alpha_0$=68°. Different return maps are possible if the angle of attack $\alpha_0$ becomes dependent on the apex height $y_i$.

An 'optimal' control model with respect to stability would be a direct projection of any initial apex height $y_i$ to a desired apex height $y_{CONTROL}$ in the next flight phase, or $y_{i+1}(y_i)$= $y_{CONTROL}$=const. as shown for apex heights of 1, 1.5, and 2 meters (left plane). This corresponds to isolines on the 3D-surface $y_{i+1}(y_i, \alpha_0)$ indicating a dependency between the angle of attack $\alpha_0$ and the initial apex height $y_i$ as shown for $y_{CONTROL}$=1, 1.5 and 2 m in the graph of FIG. 10B. The leg retraction model can approximate the optimal control strategy.

For example, in the case of a fixed angle of attack (no retraction: $\alpha_0(y_i)=\alpha_R$=const.) the surface has to be scanned at lines of constant angles $\alpha_0$ (FIG. 12A, e.g., red line: $\alpha_0$=68°). These lines are projected to the left ($y_{i+1}, y_i$)-plane in FIG. 10A and match the return map in FIG. 10A.

Consider now the 'optimal' control strategy for stable running $\alpha_0(y_i)$ fulfilling:

$$y_{i+1}(y_i)=y_{CONTROL}=\text{const.}$$

Using the identified fingerprint, this simply requires a search for isolines of constant $y_{i+1}$ on the generalized surface $y_{i+1}(y_i, \alpha_0)$, as indicated by the green lines in FIG. 12A ($y_{i+1}$=1, 1.5 and 2 m). The projection of these isolines onto the ($\alpha_0$, $y_i$)-plane represents the desired natural control strategy $\alpha_0(y_i)$ for spring-mass running as depicted for $y_{CONTROL}$=1, 1.5, 2 m in FIG. 10B.

The constant-velocity leg retraction model put forth in this paper represents a particular control strategy $\alpha_0(y_i)$ relating the angle of attack $\alpha_0$ to the apex height $y_i$ of the preceding flight phase (Eq. 11), as shown in FIG. 10B for different retraction speeds ($\omega_R$=0, 25, 50, 75°/s) and one retraction angle ($\alpha_R$=60°). It turns out that this particular leg retraction model can approximate the natural control strategy within a considerable range of apex heights if the proper retraction parameters ($\alpha_R$, $\omega_R$) are selected. The value of the retraction angle $\alpha_R$ shifts the line of the retraction control $\alpha_0(y_i)$ along the $\alpha_0$-axis, whereas the retraction speed $\omega_R$ determines the slope of the control line. Thus, the retraction parameters have different qualities with respect to the control of running; if the retraction speed $\omega_R$ guarantees the stability (setting the range and the strength of attraction to a fixed point), then the retraction angle $\alpha_R$ selects the apex height of the corresponding fixed point $y_{CONTROL}$. Due to this adaptability, a constant velocity leg retraction model can significantly enhance the stability of running compared to a swing-leg control model that employs a fixed angle of attack.

Influence of Speed on the Stability of Running

Figure 9F:
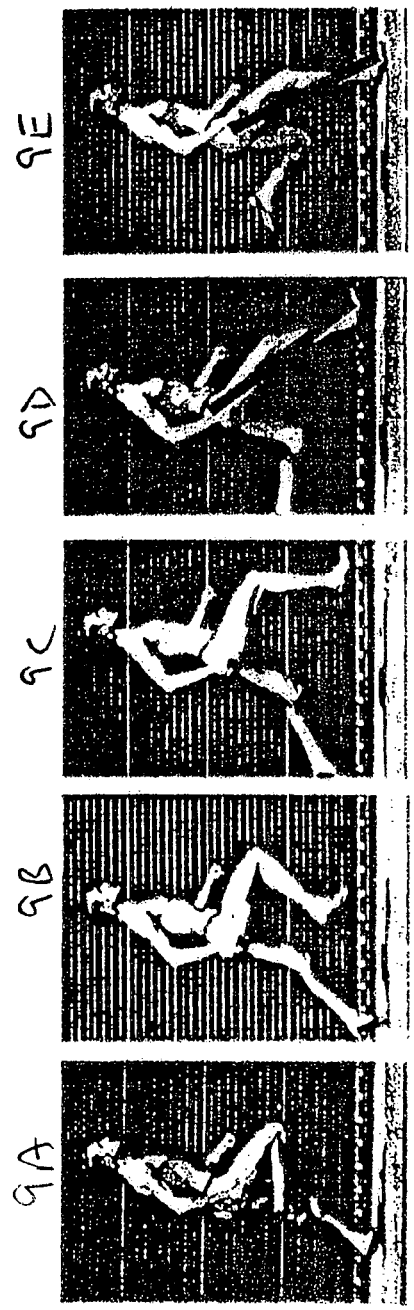
FIG. 9F is an illustration of a spring-mass model with retraction.
Figure 9F:
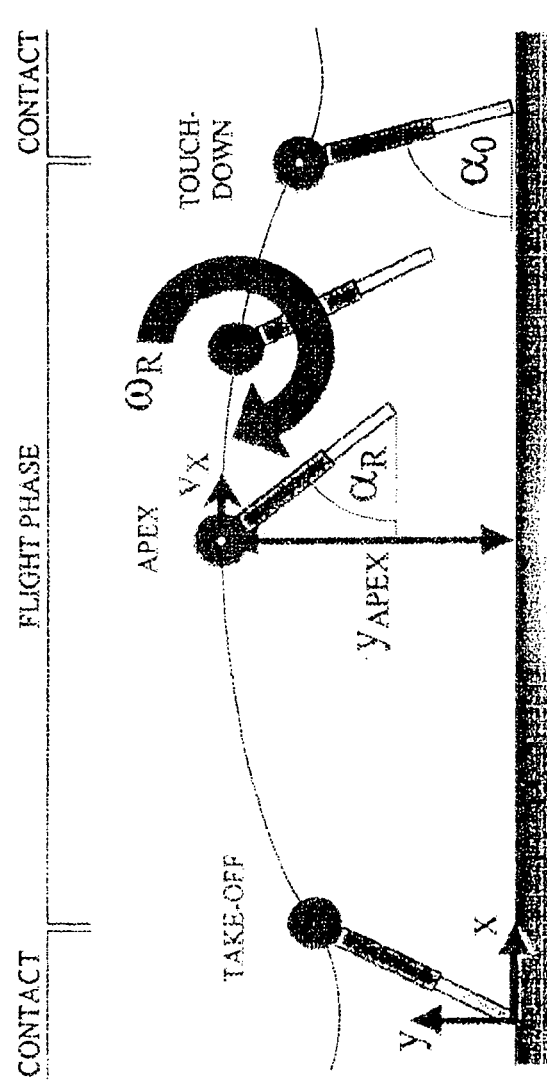

The return map discussed in conjunction with FIG. 10A indicates that the generalized surface $y_{i+1}(y_i, \alpha_0)$ is sensitive to the running speed. The selected retraction speeds in FIGS. 9 and 10 ($\omega_R$=0, 25, 50°/s) show that the slope of the return map $y_{i+1}(y_i)$ increases with decreasing running speed. As a consequence, running at 3 m/s with a fixed angle of attack $\alpha_0$=const. is not stable (FIG. 10A). However, there exists still a natural control strategy represented by the isolines of the corresponding generalized surface with $y_{i+1}(y_i, \alpha_0)$=const. (not shown here). In comparison to a fixed angle of attack control, leg retraction is shifted towards this natural control (FIG. 10B). Thus, it is a successful strategy to stabilize running below the critical speed observed in the fixed angle control.

The analysis reveals that the stability of spring-mass running is highly sensitive to the angular velocity of the leg before landing. However, due to the simplicity of the approach, we cannot exclude that alternative strategies could be crucial for stable running (i.e. leg retraction could be the biological way of stabilizing running).

An experimental study on obstacle avoidance during walking found that subjects used visual information (e.g. obstacle placement and size) selecting the proper kinematic program to cope with such environmental disturbances. In literature only few studies are available on possible control strategies for stable running. One investigated regulatory mechanisms to secure proper footing. Therefore, it studied subjects running on a treadmill on irregularly spaced targets. To hit the targets step length was modulated by increasing the vertical impulse during stance phase using visual perception. This indicates that vision is important, however, it remains unclear, to what extent mechanical or neuro-muscular mechanisms may contribute to stabilize running over uneven ground without footing constraints.

For instance, the intrinsic properties of muscle lead to immediate responses to length and particularly velocity perturbations. Since this behavior depends on the muscle activation and, consequently, on the neural control scheme it is called "preflex." One an analytical study showed that a self-stabilizing oscillatory leg operation emerges if well-established muscle properties are adopted. This suggests that during cyclic locomotor-y tasks as walking or running the system could counteract disturbances in the stance phase.

Taking the dynamics of the muscle-reflex system into account, spring-like leg operation as observed in running or jumping tasks can be achieved, if a positive feedback of the muscle force sensory signals (Golgi organs) is employed. Within such a framework the leg stiffness is not a passive systemic property anymore, but is actively modulated (e.g. central drives, intermuscular reflex pathways). Moreover, the actual leg stiffness is not a determined mechanical parameter but the expression of an energetically equalized neuro-muscular dynamics on the leg level. Consequently, the leg function during stance phase is energetically and dynamically stabilized resulting in a uniform pattern of the ground reaction force as observed in human and animal running.

At this point two complementary control strategies for running can be deduced: (1) flight phase control and (2) stance phase control. In the former, a trajectory disturbance results in an adapted landing condition (e.g. angle of attack). Leg retraction is such an approach improving stability. In the latter strategy, a changed initial landing condition leads to an adapted dynamic leg response (e.g. leg stiffness). Higher landing velocities could imply an accelerated force built-up (eccentric force enhancement) and, consequently, an increased leg stiffness.

An experiment on human running is designed to evaluate the relevance of these two alternative approaches. An instrumented treadmill is equipped with an obstacle machine consisting of a light plastic bar moving synchronized to the belt at 12 cm above the ground. The obstacle is triggered by the ground reaction force and randomly released every 9-16 seconds.

It should be appreciated that experimental results suggest that the leg operation during stance phase mainly provides a dynamically consistent behavior which stabilizes the system energy (to regain the required running speed after disturbance), whereas the leg kinematics prior to landing stabilizes a desired trajectory of the center of mass. The actual solution may depend on the subjects experience to cope with varied running conditions.

Leg retraction is a feedforward control scheme and, therefore, can neither avoid obstacles nor place the foot at desired targets. It rather provides a mechanical background stability, which relaxes the control effort for the locomotory task, and allows the system to concentrate on higher objectives.

The swing leg kinematics during protraction must be tuned corresponding to the available environmental information (e.g. visual, cutaneous). It remains for further research to understand to what extent the intrinsic properties of the swing leg allow for varied kinematic trajectories without loosing the stabilizing effects of leg retraction.

Future investigations are necessary to fully understand the impact of late swing phase retraction on animal stability. To gain insight into the control scheme used by running animals, the natural retraction control formulated herein may be compared to actual limb movements measured on running animals. Still further, since the spring-mass model of this study is two-dimensional, it may be desirable to generalize retraction to three dimensions to address issues of body yaw and roll stability. And finally, optimized retraction control schemes may be tested on legged robots to enhance their robustness to internal (leg stiffness variations) and external disturbances (ground surface irregularities).

In sum, swing-leg retraction can improve the stability of spring-mass running. With retraction, the spring-mass model is stable across the full range of biological running speeds and can overcome larger disturbances in the angle of attack and leg stiffness. In the stabilization of running humans and animals, swing-leg retraction is an important control consideration.

All references cited herein are hereby incorporated herein by reference in their entirety.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. A method for providing rotational leg control during a swing phase of a robotic locomotion device, the method comprising:
computing an apex height return map of two consecutive flight phases for different angles of attack;
selecting all pairs of leg angle and apex heights that result in a desired apex height of a next consecutive flight phase;
for each leg angle-apex height pair, computing the corresponding flight times from apex to touch-down; and
storing dependencies between flight time after apex and leg angle for any desired consecutive apex heights.

2. The method of claim 1 further comprising determining an instant of apex during flight phase by a vertical take-off velocity.

3. The method of claim 2 further comprising controlling the angular leg orientation using the stored time dependencies for a desired apex height.

4. The method of claim 3 wherein controlling the angular leg orientation begins starting at apex.

5. The method of claim 1 wherein computing an apex height return map of two consecutive flight phases for different angles of attack comprises computing a distinct map for each of a plurality of different mechanical energy levels.

6. The method of claim 4 wherein controlling the angular leg orientation using the stored time dependencies for the desired apex height starting at apex, includes controlling the angular leg orientation such that the leg will reach the next apex in response to the leg contacting a surface at any time before or after an expected time.

7. The method of claim 4 further comprising at least one of: protracting the leg after the time to apex and retracting the leg after the time to apex.

8. The method of claim 3 wherein controlling the angular leg orientation includes moving the leg to a desired leg orientation at time to apex.

9. The method of claim 8 wherein controlling the angular leg orientation begins starting at apex.

10. A method of moving a leg of a robotic system, the method comprising:
determining a time to apex;
selecting an angle of attack based upon time after apex; and
providing rotational leg control continuously during the time after apex until touch-down occurs such that the leg is at a desired angle of attack when touch-down occurs.

11. The method of claim 10 wherein determining a time to apex comprises computing a time series.

12. The method of claim 10 wherein selecting an angle of attack based upon time after apex comprises retrieving an angle of attack from a lookup table based upon time after apex.

13. The method of claim 12 further comprises providing a lookup table having stored therein values corresponding to a mapping of apex heights of two consecutive flight phases for different angles of attack.

14. The method of claim 13 wherein providing a lookup table comprises providing a lookup table having stored therein a map of apex heights of two consecutive flight phases for different angles of attack for one or more mechanical energy levels of the robotic system.

15. The method of claim 10 further comprising providing a lookup table that projects all possible apex heights to a desired apex height in a next flight phase.

16. The method of claim 15 further comprising selecting the desired apex height.

17. The method of claim 16 wherein providing rotational leg control comprises providing rotational leg control starting at apex.

18. The method of claim 10 wherein determining a time to apex comprises:
computing a vertical take-off position; and
computing a vertical velocity at take-off from leg angle and leg length.

19. The method of claim 18 further comprising:
using the time to apex to determine an angle of attack in a lookup table that associates a mapping of the apex height to the desired apex height with the angle of attack.

20. The method of claim 18 further comprising:
computing the angle of attack from the computed apex height and desired apex height.

21. The method of claim 20 further comprising:
computing a vertical position and velocity at take-off from the leg angle and leg length;
computing an instant of apex within the flight phase from the vertical velocity at take-off;
computing mechanical system energy at take-off from the horizontal and vertical velocity at take-off and the vertical position at take-off; and
using the mechanical system energy at take-off and the instant of apex to determine a continuous adjustment in leg rotation that produces the angle of attack.

22. A robot comprising:
a body;
a leg coupled to the body;
a sensor, coupled to the leg, to provide a control signal indicating detection of a contact phase of the leg;
a sensor, coupled to the body and the leg, to provide a control signal indicating the leg orientation;
a sensor, coupled to the leg, to provide a control signal indicating the leg length;
a controller, coupled to the body and responsive to the control signals, to determine for a next contact phase an angle of attack to reach a desired apex height in a flight phase following the next contact phase; and
an actuator, coupled to the controller and the leg, to adjust orientation of the leg during a flight phase occurring between the contact phase and the next contact phase to achieve the angle of attack.

23. The robot of claim 22 further comprising a memory, coupled to the controller, said memory having stored therein values corresponding to dependencies between flight time after apex and leg angle for any desired consecutive apex heights.

24. The robot of claim 23 wherein said controller controls the angular leg orientation by retrieving stored time dependency values for a desired apex height from said memory.

25. The method of claim 24 wherein said controller begins controlling the angular leg orientation starting at apex.

26. The robot of claim 25 wherein the values stored in the lookup table correspond to values for a given system energy.

27. A method for providing rotational leg control during a swing phase of a robotic locomotion device, the method comprising:
identifying kinematic control elements of the leg;
identifying energetic control elements of the leg to control system energy within the robotic locomotion device; and
separating the kinematic control elements of the leg from the energetic control elements of the leg.

28. A method for providing rotational leg control during a swing phase of a robotic locomotion device, the method comprising:
identifying kinematic control elements of the leg;
identifying energetic control elements of the leg;
separating the kinematic control elements of the leg from the energetic control elements of the leg;
determining an energetic control level of the leg to control system energy within the robotic locomotion device; and
determining a kinematic control level of the leg to provide a desired energetically possible movement trajectory within one step.

29. The method of claim 28 wherein identifying energetic control elements of the leg further comprises identifying energetic control elements of the leg to control system energy within the robotic locomotion device.

30. The method of claim 27 further comprising:
determining an energetic control level of the leg to control system energy within the robotic locomotion device; and
determining a kinematic control level of the leg to provide a desired energetically possible movement trajectory within one step.

* * * * *

UNITED STATES PATENT AND TRADEMARK OFFICE
CERTIFICATE OF CORRECTION

PATENT NO.       : 7,295,892 B2
APPLICATION NO.  : 10/750573
DATED            : November 13, 2007
INVENTOR(S)      : Herr et al.

It is certified that error appears in the above-identified patent and that said Letters Patent is hereby corrected as shown below:

Column 3, line 52 delete "3'-10B." and replace with --FIGS. 3-10B--.

Column 4, line 9 delete "(e.g. the ground) a" and replace with --(e.g. the ground), a--.

Column 4, line 11 delete "(x" and replace with --$\alpha$--.

Column 4, line 35 delete "]".

Column 4, line 45 delete ", for example and" and replace with --, for example, and--.

Column 4, line 54 delete "contact phases 34 the" and replace with --contact phases 34, the--.

Column 4, line 66 delete "locomotion the" and replace with --locomotion, the--.

Column 5, line 52 delete "form" and replace with --from--.

Column 5, line 67 delete "flight" an replace with --flight:--.

Column 6, lines 55-56 delete "sensors one" and replace with --sensors, one--.

Column 7, line 5 delete "10".

Column 7, line 12 delete "108." and replace with --108).--.

Column 7, line 45 after "according" insert the word --to--.

Column 7, line 49 delete "comparable" and replace with --comparably--.

Column 8, line 20 delete "touch-down the" and replace with --touch-down, the--.

Column 8, line 27 delete "Act" and replace with --$\Delta\alpha$--.

Column 8, line 31 delete "an" and replace with --a--.

Column 8, line 45 delete "robot." and replace with --robots.--.

UNITED STATES PATENT AND TRADEMARK OFFICE
CERTIFICATE OF CORRECTION

PATENT NO. : 7,295,892 B2
APPLICATION NO. : 10/750573
DATED : November 13, 2007
INVENTOR(S) : Herr et al.

It is certified that error appears in the above-identified patent and that said Letters Patent is hereby corrected as shown below:

Column 8, line 60 delete " $\Delta E = \int F_{axial} \ell \, dt$. " and replace with -- $\Delta E = \int F_{axial} \dot{\ell} \, dt$. --.

Column 9, line 4 delete "Should" and replace with --should--.

Column 9, line 43 delete "these" and replace with --this--.

Column 9, line 50 delete "formulation the" and replace with --formulation, the--.

Column 9, line 65 delete "conservative it" and replace with --conservative, it--.

Column 10, line 12 delete "impose" and replace with --imposes--.

Column 10, line 35 delete "an" and replace with --and--.

Column 11, line 14 delete "which and estimate" and replace with --which an estimate--.

Column 11, line 15 delete "take-of" and replace with --take-off--.

Column 11, line 19 delete "the" and replace with --then--.

Column 11, line 56 delete "$y_{APEX}$*" and replace with --$y*_{APEX}$--.

Column 11, line 60 delete "$y_{i+1} = y_i = y_{APEX}$*" and replace with --$y_{i+1} = y_i = y*_{APEX}$--.

Column 12, line 47 delete "a" and replace with --, a--.

Column 12, line 56 delete "step this" and replace with --step, this--.

Column 14, line 14 delete "literature only" and replace with --literature, only a--.

Column 14, line 28 delete "one an analytical" and replace with --one analytical--.

Column 14, line 31 delete "locomotor-y" and replace with --locomotory--.

Column 14, line 31 delete "running the" and replace with --running, the--.

Column 14, line 37 delete "framework the" and replace with --framework, the--.

UNITED STATES PATENT AND TRADEMARK OFFICE
CERTIFICATE OF CORRECTION

PATENT NO. : 7,295,892 B2
APPLICATION NO. : 10/750573
DATED : November 13, 2007
INVENTOR(S) : Herr et al.

It is certified that error appears in the above-identified patent and that said Letters Patent is hereby corrected as shown below:

Column 14, line 47 delete "point two" and replace with --point, two--.

Signed and Sealed this

Fifteenth Day of April, 2008

JON W. DUDAS
*Director of the United States Patent and Trademark Office*